United States Patent
Schüle

(10) Patent No.: US 7,661,409 B2
(45) Date of Patent: Feb. 16, 2010

(54) OPERATING METHOD AND DEVICE FOR A GAS-OPERATED INTERNAL COMBUSTION ENGINE

(75) Inventor: Harry Schüle, Neunburg V. Wald (DE)

(73) Assignee: Siemens Aktiengesellschaft, Munich (DE)

( * ) Notice: Subject to any disclaimer, the term of this patent is extended or adjusted under 35 U.S.C. 154(b) by 117 days.

(21) Appl. No.: 11/918,017

(22) PCT Filed: Apr. 7, 2006

(86) PCT No.: PCT/EP2006/061441

§ 371 (c)(1), (2), (4) Date: Oct. 5, 2007

(87) PCT Pub. No.: WO2006/106145

PCT Pub. Date: Oct. 12, 2006

(65) Prior Publication Data

US 2009/0055077 A1    Feb. 26, 2009

(30) Foreign Application Priority Data

Apr. 8, 2005    (DE) .................... 10 2005 016 281

(51) Int. Cl.
F02B 43/00 (2006.01)
F02B 43/02 (2006.01)

(52) U.S. Cl. ..................................... 123/458; 123/527

(58) Field of Classification Search .................. 123/525, 123/527, 575, 577, 458, 1 A, DIG. 12, DIG. 13; 701/103

See application file for complete search history.

(56) References Cited

U.S. PATENT DOCUMENTS

| 5,367,999 A | 11/1994 | King et al. |
| 6,701,905 B1 | 3/2004 | Gaskins |
| 2003/0192513 A1 | 10/2003 | Nist |

FOREIGN PATENT DOCUMENTS

| DE | 4332107 A1 | 3/1994 |
| DE | 203 18 684 U1 | 4/2004 |

(Continued)

OTHER PUBLICATIONS

Japanese Office Action, App. No. 2008-504784, 9 pages, May 20, 2009.

Primary Examiner—Mahmoud Gimie
(74) Attorney, Agent, or Firm—King & Spalding L.L.P.

(57) ABSTRACT

The invention relates to an operating method and to a device for a gas-driven internal combustion engine. According to the invention, the pressure in a gas injection system is adapted to the operational state of the internal combustion engine. A higher pressure is adjusted in the gas injection system during a higher charge of the internal combustion engine. Said higher pressure enables a higher volume flow through the gas injection valves associated with the gas injection system. The power produced by the internal combustion engine can be optimized. A lower pressure in the gas injection system is adjusted in the event of a lower charge or if the internal combustion engine is switched off. The lower pressure emits lower pollutant emissions which are produced by the internal combustion engine. The invention is characterized by a bi-directional interface between a control device and a pressure reducer or pressure controller.

10 Claims, 2 Drawing Sheets

FOREIGN PATENT DOCUMENTS

| | | | |
|---|---|---|---|
| DE | 10335152 A1 | 3/2005 |
| DE | 10146051 A1 | 11/2007 |
| EP | 1 209 336 A2 | 5/2002 |
| EP | 1264976 B1 | 12/2002 |
| EP | 1 435 450 A2 | 7/2004 |
| FR | 28576325 A1 | 1/2005 |
| JP | 09053485 A | 2/1997 |
| JP | 09096254 A | 4/1997 |
| JP | 2002235571 A | 8/2002 |
| JP | 2004353458 A | 12/2004 |

OPERATING METHOD AND DEVICE FOR A GAS-OPERATED INTERNAL COMBUSTION ENGINE

CROSS REFERENCE TO RELATED APPLICATIONS

This application is the US National Stage of International Application No. PCT/EP2006/061441, filed Apr. 7, 2006 and claims the benefit thereof. The International Application claims the benefits of German application No. 10 2005 016 281.9 filed Apr. 8, 2005, both of the applications are incorporated by reference herein in their entirety.

FIELD OF INVENTION

The invention relates to a method for a gas-operated internal combustion engine and to a device for an internal combustion engine of said type according to the claims.

BACKGROUND OF THE INVENTION

For economic and environmental reasons, internal combustion engines operated using gas offer an alternative to conventional internal combustion engines operated using gasoline or diesel. Bivalent internal combustion engines that can be operated using both gas and, for example, gasoline are also employed for enhancing the user's flexibility.

Gas-operated systems usually have a tank for storing the gaseous fuel. It is stored under high pressure. For vehicles operated using natural gas the pressure during storage is around 200 bar; said pressure can in the case of hydrogen-operated vehicles assume values of up to approximately 700 bar. The gaseous fuel reaches a gas-injection system via shut-off valves and pressure reducers. The internal combustion engine is finally supplied with gas by means of gas-injection valves assigned to the gas-injection system. The pressure in the gas-injection system is usually constant and for vehicles operated using natural gas is in a range between 3 bar and 15 bar. There are disadvantages in operating the gas-injection system at a constant pressure in that it has to be selected such as to insure the internal combustion engine's reliable operation under any conditions occurring.

Thus when the internal combustion engine is operating under a heavy load, high pressures will be desirable in the gas-injection system to enable a high volume flow through the gas-injection valves. Conversely, when the internal combustion engine is operating under a light load, for example while idling, low pressures will be desirable because its gas supply can be controlled more precisely at low pressures. A low pressure is furthermore advantageous when the internal combustion engine is shut off or, in the case of a bivalent system, is switched over to another type of fuel because the amount of residual gas in the gas-injection system reduces as the pressure falls. The amount of gas that can escape through leaking valves into the surrounding area or into an inlet pipe will thus also reduce. Since the gas-injection valves do not close completely even in their closed position, a certain amount of gas will reach the internal combustion engine via the gas-injection valves even after it has been shut off. Said amount of gas increases in line with the pressure prevailing in the gas-injection system. Said amount of gas will when the internal combustion engine is next started result in undesired enriching of the fuel mixture and hence in increased noxious emissions. More gas can furthermore be taken from the tank owing to the lower pressure and the range of a vehicle being driven by means of the internal combustion engine hence increased.

DE 103 35 152 A1 describes a monitoring device and an operating method for a gas-operated internal combustion engine. For monitoring a gas-operated internal combustion engine a loss of gas leaked from an gas-injection system is determined by means of a measuring device. An operating variable of the internal combustion engine such as, for example, the amount of fuel injected by the gas-injection system as part of a starting process, is then influenced as a function of the determined leaked loss of gas.

SUMMARY OF INVENTION

The object of the invention is to provide an economical method and a device for reducing the noxious emissions from gas-operated internal combustion engines and enhancing their performance, and for increasing the range of vehicles driven by means of gas-operated internal combustion engines.

Said object is achieved by means of the features of the independent claims. Advantageous embodiments of the invention are given in the subclaims.

The invention is distinguished by a method and a corresponding device for matching the pressure in a gas-operated internal combustion engine's gas-injection system to the internal combustion engine's operating conditions. When the internal combustion engine is operating under a heavy load, a high pressure will be set in the gas-injection system by means of the device. A high volume flow through gas-injection valves belonging to the gas-injection system will be enabled by the high pressure. The internal combustion engine's performance can in that way be optimized. A lower pressure will be set in the gas-injection system when the internal combustion engine is operating under a light load or is shut off. The noxious emissions produced by the internal combustion engine will be reduced thanks to the lower pressure. A low pressure will furthermore enable more precise dosing of the amount of gas supplied to the internal combustion engine. More gas can, moreover, be taken from the tank owing to the lower pressure and the range of the vehicle being driven by means of the internal combustion engine hence increased. The inventive method and the device can be employed for internal combustion engines operated using either natural gas or hydrogen or other types of gas and for bivalent internal combustion engines.

In an advantageous embodiment of the invention the internal combustion engine's rotational speed, torque, or load are used as quantities for defining the pressure in the gas-injection system. The aforementioned quantities allow particularly accurate information to be obtained about the internal combustion engine's current operating condition.

In a further advantageous embodiment of the invention the pressure in the gas-injection system is set to a very low value in order to realize an emergency operating mode of the internal combustion engine. Said emergency operating mode is applied to increase the range of the vehicle being operated by means of the internal combustion engine when the tank has a low gas charge. That will make it possible to drive to a nearby gas station. The pressure in the emergency operating mode is lower than that occurring when the internal combustion engine is operating normally. More gas can be taken from the tank owing to the lower pressure and the range hence increased.

In a further advantageous embodiment the pressure in a bivalent internal combustion engine's gas-injection system is matched to the internal combustion engine's operating conditions. Thus, for example, the pressure can be reduced prior to changing over from operation using gas to operation using another fuel such as, for instance, gasoline or diesel. The amount of gas remaining in the gas-injection system will be reduced thereby. The amount of gas reaching an intake manifold of the internal combustion engine via the not completely closing gas-injection valves will consequently also be less. Enriching of the mixture fed to the internal combustion engine operated using gasoline or diesel by the amount of gas located in the intake manifold will hence also be less. The result will be a reduced emission of noxious substances.

In a further advantageous embodiment the amount of gas in the tank or, in the case of bivalent internal combustion engines, the amount of another type of fuel is used as the parameter for changing over from normal operation to the emergency operating mode.

In a further advantageous embodiment of the invention the pressure in the gas-injection system is controlled via a module containing at least one shutoff valve for shutting off the supply of gas from the tank to the module, one pressure sensor for measuring the gas pressure, one temperature sensor for measuring the gas temperature, one pressure reducer or pressure controller for controlling the pressure in the gas-injection system, and one electronic control unit for determining and defining the pressure in the gas-injection system. Integrating of the aforementioned components into a single module will yield substantial advantages in terms of cost and handling compared with a system in which all or some components are housed separately. The expenditure for cables and leads linking the components will be reduced.

In a further advantageous embodiment the module contains, alongside the aforementioned components, a pressure-release valve for limiting the pressure in the gas-injection system. Costs can be reduced through integrating said additional component. The pressure-release valve can be used also for quickly reducing the pressure in the gas-injection system.

In a further advantageous embodiment the module contains, alongside the aforementioned components, an electric heater for heating the module. The pressure controller or pressure reducer located in the module needs to be heated to prevent components from icing when the gas expands. Complex connecting of the module to the vehicle's cooling-water circuit can be dispensed with thanks to the electric heater.

In a further advantageous embodiment the module contains a bidirectional interface for exchanging data with control devices such as, for example, an engine control device. Said interface is expediently integrated in the electronic control unit. Important quantities such as, for instance, the internal combustion engine's rotational speed, torque, or load can be transmitted via the interface from the engine control device to the module for matching the pressure in the gas-injection system to the internal combustion engine's operating conditions. Data such as, for example, the pressure in the tank or gas-injection system can furthermore be conveyed by the module to other control devices.

In a further advantageous embodiment the module is integrated in the tank. Said integrating will reduce costs and simplify system handling through rendering a high-pressure line between the tank and module unnecessary.

BRIEF DESCRIPTION OF THE DRAWINGS

Exemplary embodiments of the invention are explained below with the aid of the diagrammatic drawings.

DETAILED DESCRIPTION OF INVENTION

Figure 1:
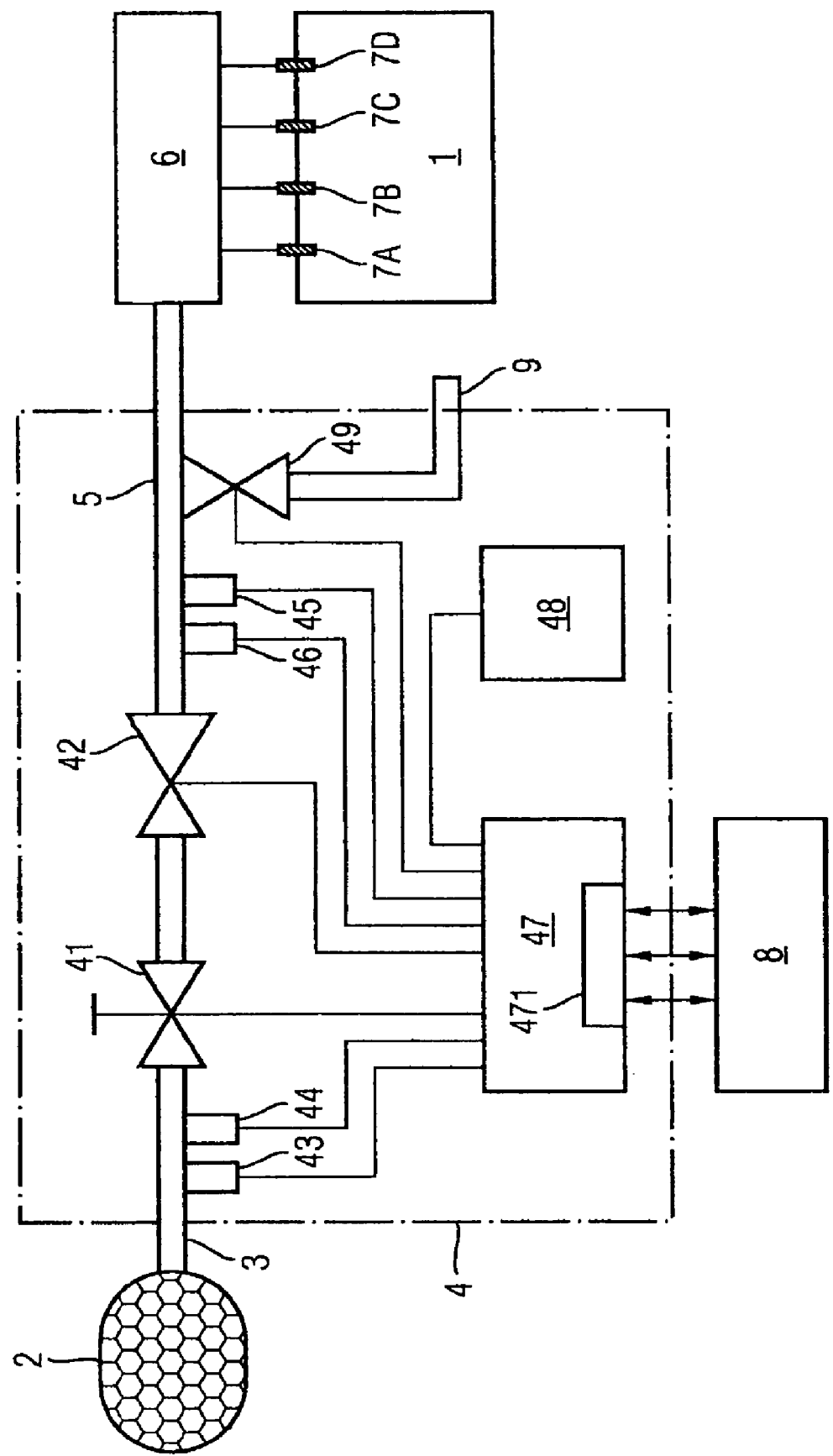
FIG. 1 is a diagrammatic representation of a gas-operated internal combustion engine and FIG. 2 is a flowchart of a method for matching the pressure in a gas-injection system to an internal combustion engine's operating conditions.

FIG. 1 shows a gas-operated internal combustion engine 1 in diagrammatic form. The gaseous fuel is stored in a tank 2 under high pressure. For internal combustion engines 1 operated using natural gas the pressure during storage is around 200 bar; said pressure can in the case of hydrogen-operated internal combustion engines 1 assume values of up to approximately 700 bar. The gaseous fuel is ducted over a high-pressure line 3 to a low-pressure line 5 via a shutoff valve 41 and a pressure reducer or pressure controller 42. The gas supply from the tank 2 can be blocked via the shutoff valve 41, as will be required, for example, when the internal combustion engine 1 is shut off or, in the case of bivalent internal combustion engines 1, is switched over to another type of fuel. The pressure reducer or pressure controller 42 serves to reduce the gas pressure to the values needed for the low-pressure line 5. The low-pressure line 5 is linked to a gas-injection system 6. The internal combustion engine 1 is supplied with the gaseous fuel via gas-injection valves 7A to 7D assigned to the gas-injection system 6. The pressure in the low-pressure line 5 and gas-injection system 6 is usually constant and in the case of internal combustion engines 1 operated using natural gas is in a range between 3 bar and 15 bar. The inventive method provides for matching the pressure in the gas-injection system 6 to the operating conditions of the internal combustion engine 1. The pressure in the low-pressure line 5 is the same as that in the gas-injection system 6.

In this exemplary embodiment the shutoff valve 41 and the pressure reducer or pressure controller 42 are combined in a module 4 into a single structural unit. The module further contains a temperature sensor 43 and a pressure sensor 44 for registering the pressure and temperature on the high-pressure side, a corresponding temperature sensor 45 and pressure sensor 46 on the low-pressure side, an electronic control unit 47, an electric heater 48, and a pressure-release valve 49. The desired values for the pressure in the gas-injection system 6 are determined in the electronic control unit 47 as a function of the operating conditions of the internal combustion engine 1. It is made clear through the connecting leads between the electronic control unit 47 and the other components located in the module 4 that the signals of the pressure and temperature sensors for controlling the pressure in the gas-injection system 6 are evaluated in the electronic control unit 47 and actuating signals for the shutoff valve 41, the pressure reducer or pressure controller 42, the electric heater 48, and the pressure-release valve 49 are generated there. Important information for diagnosing the individual components can also be transmitted over the connecting leads.

The electronic control unit 47 further contains a bidirectional interface 471 for exchanging data with a control device 8 located outside the module. Important data for defining the pressure in the gas-injection system 6 such as, for example, the rotational speed, torque, or load of the internal combustion engine 1 can be conveyed to the electronic control unit 47 via the control device 8. It is also possible to transmit data to the control device 8 proceeding from the electronic control unit 47. Thus, for instance, the data of the pressure or temperature sensors or diagnostic data can be transmitted to the control device 8. For example an engine control device can be used as the control device 8. The bidirectional interface 471 is expediently embodied as an electronic data bus, for example a CAN bus.

Complex connecting of the module 4 to a cooling-water circuit of the internal combustion engine 1 can be dispensed with thanks to the electric heater 48 serving to heat the module 4. The pressure-release valve 49 serves to limit the pressure in the gas-injection system 6. The pressure in the gas-injection system 6 can be reduced by way of the pressure-release valve 49 via an ambient line 9.

In the embodiment shown in FIG. 1 the module 4 is located outside the tank 2. The module 4 can for an advantageous embodiment be integrated in the tank 2. The high-pressure line 3 will in that case be dispensed with. The inventive method can also be implemented using a device in the case of which the components 41 to 49 shown in FIG. 1 are in total or in part not integrated in the module 4 but instead have their own housing. Moreover, not all the components 41 to 49 shown in FIG. 1 are necessary for implementing the inventive method.

Figure 2:
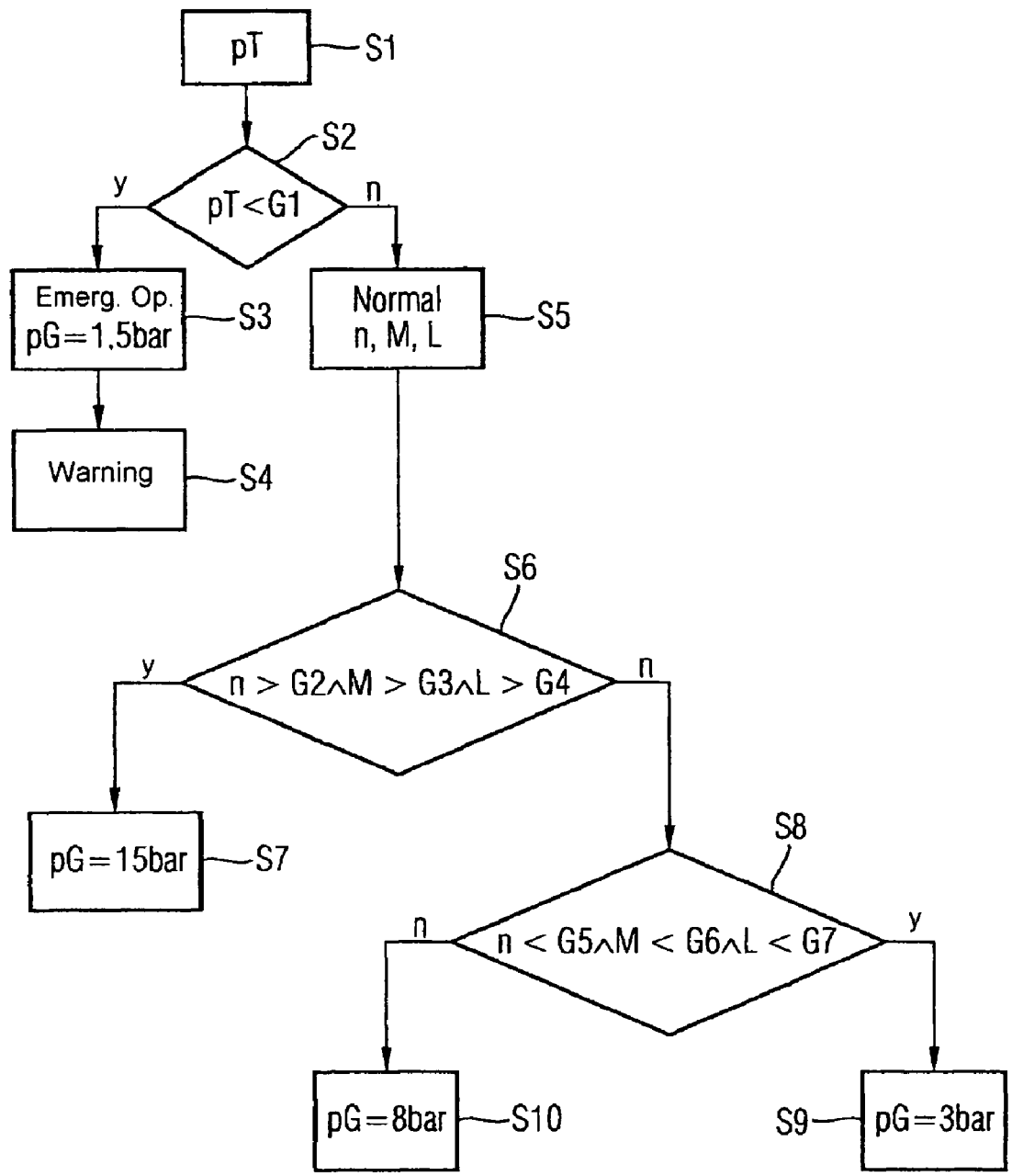

FIG. 2 is a flowchart of a possible method for matching the pressure in the gas-injection system 6 to the operating conditions of the internal combustion engine 1. At step S1 the pressure pT in the tank 2 is registered by the pressure sensor 44 and conveyed to the electronic control unit 47. A check is then performed at step S2 to determine whether the measured pressure pT in the tank 2 is below a threshold value G1. If it is, then it will be decided that the amount of gas remaining in the tank 2 is so small as to initiate the emergency operating mode "Emerg. op." at step S3. The desired pressure pG in the gas-injection system 6 will be defined as having the very low value of 1.5 bar in order to increase the range of a vehicle being driven by means of the internal combustion engine 1. The driver of the vehicle is at step S4 displayed a warning message "Warning". The warning message "Warning" can be fed out via, for example, the bidirectional interface 471 to the control device 8 and displayed from there. The rotational speed n, the torque M, and the load L of the internal combustion engine 1 will otherwise be registered during normal operation "Normal" at step S5. Said qualities can be conveyed by the control device 8 to the electronic control unit 47 via the bidirectional interface 471. A check is performed at ensuing step S6 to determine whether the rotational speed n exceeds a threshold value G2, the torque M exceeds a threshold value G3, and the load L of the internal combustion engine 1 exceeds a threshold value G4. If that condition has been met, then the internal combustion engine 1 is operating under a heavy load and a high value of, for example, 15 bar will be defined at step S7 for the desired pressure pG in the gas-injection system 6. If that condition has not been met, then a check will be performed at step S8 to determine whether the rotational speed n is below a threshold value G5, the torque M is below a threshold value G6, and the load of the internal combustion engine 1 is below a threshold value G7. If that is the case, then the internal combustion engine 1 is operating under only a light load and a low value of, for example, 3 bar will be defined at step S9 for the desired pressure pG in the gas-injection system 6. If the condition has not been met, then a value of, for example, 8 bar will be defined at step S10 for the desired pressure pG in the gas-injection system 6.

In this exemplary embodiment, four values are defined for the desired pressure pG in the gas-injection system 6 depending on the operating conditions of the internal combustion engine 1. For another exemplary embodiment it is conceivable for the respective desired pressures pG to be determined using a mathematical calculation rule based on the operating parameters of the internal combustion engine 1. The pressure in the gas-injection system 6 can be adjusted to the respective desired value pG through registering of the value measured by the pressure sensor 46. Actuating variables for the pressure reducer or pressure controller 42 or the pressure-release valve 49 are determined in the electronic control unit 47 as a function of the difference between the desired pressure pG and measured value. The pressure-release valve 49 can be used for controlling the pressure in the gas-injection system 6 if the pressure needs to be reduced faster.

The invention claimed is:

1. A method for a gas-operated internal combustion engine comprising:
    an electronic control unit defining a desired gas pressure in a gas-injection system of the internal combustion engine as a function of operating conditions of the internal combustion engine, the operating conditions including at least one of a rotational speed, a torque, and a load of the internal combustion engine; and
    the electronic control unit matching the desired pressure in the gas-injection system at least by:
        evaluating signals from a pressure sensor and a temperature sensor; and
        generating actuating signals for controlling a shutoff valve, a pressure reducer or pressure controller, and a pressure-release valve.

2. The method as claimed in claim 1, further comprising generating actuating signals for controlling an electric heater.

3. The method as claimed in claim 2, wherein a pressure less than a normal operating pressure of the internal combustion engine is defined in the gas-injection system to enable an emergency operating mode of the internal combustion engine and to increase the range of a vehicle being driven by the internal combustion engine.

4. The method as claimed in claim 3, wherein the gas-operated internal combustion engine is part of a bivalent internal combustion engine which also operates using gas and also gasoline or diesel as a fuel.

5. The method as claimed in claim 4, wherein a changeover to the emergency operating mode takes place depending on the amount of gas in a tank or as a function of a remaining quantity of gasoline or diesel fuel.

6. A device for a gas-operated internal combustion engine, comprising:
    a module having:
        a shutoff valve,
        a pressure sensor,
        a temperature sensor,
        a pressure reducer or pressure controller,
        a pressure-release valve, and
        an electronic control unit configured to:
            define a desired gas pressure in a gas-injection system of the internal combustion engine as a function of one or more operating conditions of the internal combustion engine; and
            match the desired pressure in the gas-injection system at least by evaluating signals from the pressure sensor and the temperature sensor, and generating actuating signals for controlling the shutoff valve, the pressure reducer or pressure controller, and the pressure-release valve.

7. The device as claimed in claim 6, wherein the module further comprises an electric heater.

8. The device as claimed in claim 7, wherein the electronic control unit is further configured to generate actuating signals for controlling the electric heater.

9. The device as claimed in claim 8, wherein the module contains at least one bidirectional interface.

10. The device as claimed in claim 9, wherein the module is integrated into a tank.

* * * * *